US006587826B1

(12) United States Patent
Laneman et al.

(10) Patent No.: US 6,587,826 B1
(45) Date of Patent: Jul. 1, 2003

(54) CHANNEL CODE CONFIGURATIONS FOR DIGITAL AUDIO BROADCASTING SYSTEMS AND OTHER TYPES OF COMMUNICATION SYSTEMS

(75) Inventors: Jerry Nicholas Laneman, Cambridge, MA (US); Deepen Sinha, Chatham, NJ (US); Carl-Erik Wilhelm Sundberg, Chatham, NJ (US)

(73) Assignee: Agere Systems Inc., Allentown, PA (US)

(*) Notice: Subject to any disclaimer, the term of this patent is extended or adjusted under 35 U.S.C. 154(b) by 0 days.

(21) Appl. No.: 09/464,043

(22) Filed: Dec. 15, 1999

(51) Int. Cl.$^7$ .......................... G10L 21/04; H03M 13/00
(52) U.S. Cl. .................. 704/503; 714/752; 714/758
(58) Field of Search .......................... 348/487; 375/222, 375/250, 260, 262; 704/229; 714/701, 704, 752, 755, 746, 758

(56) References Cited

U.S. PATENT DOCUMENTS

| | | | |
|---|---|---|---|
| 5,463,641 A | | 10/1995 | Dorward et al. |
| 5,812,603 A | * | 9/1998 | Luthi et al. .................. 375/287 |
| 5,870,405 A | * | 2/1999 | Hardwick et al. .......... 708/203 |
| 6,357,029 B1 | * | 3/2002 | Sinha et al. ................. 714/701 |
| 2002/0040460 A1 | * | 4/2002 | Choi et al. .................. 714/755 |

OTHER PUBLICATIONS

Clark, et al., "Error–Correction Coding for Digital Communications," 1981, Plenum Press, pp. 331–333.*
D. Sinha, J.D. Johnston, S. Dorward and S.R. Quackenbush, "The Perceptual Audio Coder," in Digital Audio, Section 42, pp. 42–1 to 42–18, CRC Press, 1998.
N.S. Jayant and E.Y. Chen, "Audio Compression: Technology and Applications," AT&T Technical Journal, pp. 23–34, vol. 74, No. 2, Mar.–Apr. 1995.
B.W. Kroeger and A.J. Vigil, "Improved IBOC DAB Technology for AM and FM Broadcasting," SBE Engineering Conference, pp. 1–10, 1996.
B.W. Kroeger and D. Cammarata, "Robust Modem and Coding Techniques for FM Hybrid IBOC DAB," IEEE Transactions on Broadcasting, vol. 43, No. 4, pp. 412–420, Dec. 1997.
B.W. Kroeger and P.J. Peyla, "Compatibility of FM Hybrid In–Band On–Channel (IBOC) System for Digital Audio Broadcast," IEEE Transactions on Broadcasting, vol. 43, No. 4, pp. 421–430, Dec. 1997.

* cited by examiner

Primary Examiner—Marsha D. Banks-Harold
Assistant Examiner—V. Paul Harper
(74) Attorney, Agent, or Firm—Ryan, Mason & Lewis, LLP

(57) ABSTRACT

Improved channel code configurations for use in transmission of digital audio or other types of information in a digital communication system. The channel code may include an outer channel code, e.g., a cyclic redundancy code (CRC), and an inner channel code, e.g., a complementary punctured pair convolutional (CPPC) code. In accordance with the invention, multiple code words of the outer code are associated with a given packet of the digital information, in accordance with a particular outer code configuration, so as to provide partial error flagging for different portions of the given packet. An information encoder, e.g., a PAC encoder, interacts with an outer code encoder to determine a bit allocation for transmission of packets at a particular bit rate, based at least in part on the outer code configuration. The invention is particularly well-suited for use in the transmission of digital audio information in a hybrid in-band on-channel (HIBOC) digital audio broadcasting (DAB) system, but is also applicable to other types of communication systems.

30 Claims, 6 Drawing Sheets

CHANNEL CODE CONFIGURATIONS FOR DIGITAL AUDIO BROADCASTING SYSTEMS AND OTHER TYPES OF COMMUNICATION SYSTEMS

FIELD OF THE INVENTION

The present invention relates generally to digital audio broadcasting (DAB) and other techniques for transmitting information in a communication system.

BACKGROUND OF THE INVENTION

Proposed systems for providing digital audio broadcasting (DAB) in the FM radio band are expected to provide near CD-quality audio, data services, and more robust coverage than existing analog FM transmissions. However, until such time as a transition to all digital DAB can be achieved, broadcasters require an intermediate solution in which the analog and digital signals can be transmitted simultaneously within the same licensed band. Such systems are typically referred to as hybrid, in-band on-channel (HIBOC) DAB systems, and are being developed for both the FM and AM radio bands. In order to prevent significant distortion in conventional analog FM receivers, the digital signal in a typical FM HIBOC DAB system is, e.g., transmitted in two sidebands, one on either side of the analog FM host signal.

Perceptual audio coding techniques are particularly attractive for FM band and AM band transmission applications such as HIBOC DAB. Perceptual audio coding devices, such as the perceptual audio coder (PAC) described in D. Sinha, J. D. Johnston, S. Dorward and S. R. Quackenbush, "The Perceptual Audio Coder," in Digital Audio, Section 42, pp. 42-1 to 42-18, CRC Press, 1998, which is incorporated by reference herein, perform audio coding using a noise allocation strategy whereby for each audio frame the bit requirement is computed based on a psychoacoustic model. PACs and other audio coding devices incorporating similar compression techniques are inherently packet-oriented, i.e., audio information for a fixed interval (frame) of time is represented by a variable bit length packet. Each packet includes certain control information followed by a quantized spectral/subband description of the audio frame. For stereo signals, the packet may contain the spectral description of two or more audio channels separately or differentially, as a center channel and side channels (e.g., a left channel and a right channel).

PAC encoding as described in the above-cited reference may be viewed as a perceptually-driven adaptive filter bank or transform coding algorithm. It incorporates advanced signal processing and psychoacoustic modeling techniques to achieve a high level of signal compression. In brief, PAC encoding uses a signal adaptive switched filter bank which switches between a Modified Discrete Cosine Transform (MDCT) and a wavelet transform to obtain compact description of the audio signal. The filter bank output is quantized using non-uniform vector quantizers. For the purpose of quantization, the filter bank outputs are grouped into so-called "codebands" so that quantizer parameters, e.g., quantizer step sizes, are independently chosen for each codeband. These step sizes are generated in accordance with a psychoacoustic model. Quantized coefficients are further compressed using an adaptive Huffman coding technique. PAC employs a total of 15 different codebooks, and for each codeband, the best codebook may be chosen independently. For stereo and multichannel audio material, sum/difference or other form of multichannel combinations may be encoded.

PAC encoding formats the compressed audio information into a packetized bitstream using a block sampling algorithm. At a 44.1 kHz sampling rate, each packet corresponds to 1024 input samples from each channel, regardless of the number of channels. The Huffman encoded filter bank outputs, codebook selection, quantizers and channel combination information for one 1024 sample block are arranged in a single packet. Although the size of the packet corresponding to each 1024 input audio sample block is variable, a long-term constant average packet length maybe maintained as will be described below.

Depending on the application, various additional information may be added to the first frame or to every frame. For unreliable transmission channels, such as those in DAB applications, a header is added to each frame. This header contains critical PAC packet synchronization information for error recovery and may also contain other useful information such as sample rate, transmission bit rate, audio coding modes, etc. The critical control information is further protected by repeating it in two consecutive packets.

It is clear from the above description that the PAC bit demand is derived primarily by the quantizer step sizes, as determined in accordance with the psychoacoustic model. However, due to the use of Huffman coding, it is generally not possible to predict the precise bit demand in advance, i.e., prior to the quantization and Huffman coding steps, and the bit demand varies from frame to frame. Conventional PAC encoders therefore utilize a buffering mechanism and a rate loop to meet long-term bit rate constraints. The size of the buffer in the buffering mechanism is determined by the allowable system delay.

In conventional PAC bit allocation, the encoder makes a request for allocating a certain number of bits for a particular audio frame to a buffer control mechanism. Depending upon the state of the buffer and the average bit rate, the, buffer control mechanism then returns the maximum number of bits which can actually be allocated to the current frame. It should be noted that this bit assignment can be significantly lower than the initial bit allocation request. This indicates that it is not possible to encode the current frame at an accuracy level for perceptually transparent coding, i.e., as implied by the initial psychoacoustic model step sizes. It is the function of the rate loop to adjust the step sizes so that bit demand with the modified step sizes is below, and close to, the actual bit allocation. The rate loop operates based on psychoacoustic principles to minimize the perception of excess noise.

Despite the above-described advances in DAB systems which utilize PAC encoding, a need exists for further improvements in techniques for transmitting digital audio and other information, so as to provide enhanced performance capabilities in these and other systems.

SUMMARY OF THE INVENTION

The present invention provides methods and apparatus for configuring a channel code, e.g., an outer channel code, in digital audio broadcasting (DAB) systems or other types of digital communication systems, so as to provide enhanced performance relative to conventional systems.

In accordance with an illustrative embodiment of the invention, digital information is encoded using an outer channel code, e.g., a cyclic redundancy code (CRC), and an inner channel code, e.g., a complementary punctured pair convolutional (CPPC) code. Multiple code words of the outer code are associated with a given packet of the digital information, in accordance with a particular outer code configuration, so as to provide partial error flagging for different portions of the given packet.

The digital information may be encoded compressed audio information in the form of a bitstream including a series of packets generated by a PAC encoder or other suitable encoder. Error flags generated as a result of the partial error flagging may be supplied to a PAC decoder and used to trigger an error mitigation algorithm in the PAC decoder. The PAC encoder is also operative to interact with an outer code encoder to determine a bit allocation for transmission of the packets at a particular bit rate, based at least in part on the outer code configuration.

Examples of outer code configurations in accordance with the invention include, e.g., multiple code words arranged sequentially within a given packet, and one or more nested levels of code words within a given packet. Combinations of these configurations can also be used, e.g., the outer code configuration may include at least one level of nested code words in combination with at least one additional sequentially-arranged code word. As another example, the outer code configuration may include a plurality of sequentially-arranged fixed-length code words followed or preceded by a single variable-length code word.

Advantageously, in each of these improved configurations, partial error flagging is provided, and the outer code structure can be made synchronous to the PAC frame. Furthermore, the overhead for the outer code may be adapted to individual PAC packets, i.e., less overhead may be provided for very short packets and larger overhead for more critical long packets. These configurations thus allow the outer code bits to be better matched to the criticality of the audio information, such that improved performance can be provided without increasing outer code overhead.

Other types of outer codes that can be used in conjunction with the invention include, e.g., RS codes, BCH codes and other block codes, other cyclic codes, as well as non-cyclic shortened codes.

The invention can be applied to other types of digital information, including, for example, data, video and image information. In addition, the invention may be implemented in numerous applications other than FM and AM HIBOC DAB systems, such as Internet and satellite broadcasting systems, systems for simultaneous delivery of audio and data, etc. Moreover, the invention is applicable not only to perceptual coders but also to other types of source encoders using other compression techniques over a wide range of bit rates.

DETAILED DESCRIPTION OF THE INVENTION

The invention in the illustrative embodiment to be described below provides outer code configuration techniques particularly well-suited for use in the transmission of audio information bits, e.g., compressed audio bits generated by an audio coder such as a perceptual audio coder (PAC). It should be understood, however, that the outer code configuration techniques of the invention may be applied to many other types of information, e.g., video or image information, and other types of coding devices. In addition, the invention may be utilized in a wide variety of different types of communication applications, including communications over the Internet and other computer networks, and over cellular multimedia, satellite, wireless cable, wireless local loop, high-speed wireless access and other types of communication systems. The invention may be utilized with any desired type of communication channel or channels, such as, for example, frequency channels, time slots, code division multiple access (CDMA) slots, and virtual connections in asynchronous transfer mode (ATM) or other packet-based transmission systems.

Figure 1:
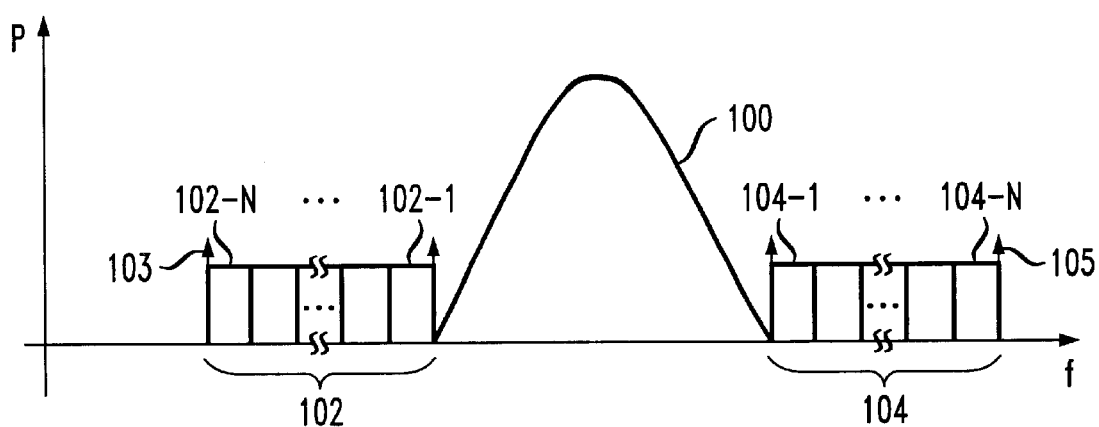
FIG. 1 shows a portion of a frequency spectrum of a hybrid, in-band on-channel (HIBOC) digital audio broadcasting (DAB) system in accordance with the invention.

FIG. 1 illustrates a portion of a frequency spectrum in an exemplary FM HIBOC DAB system in which the invention may be implemented. The spectrum is plotted as power P as a function of frequency f. The portion of the spectrum shown includes an analog host FM signal 100 with associated lower digital sideband 102 and upper digital sideband 104. The sidebands represent portions of the frequency spectrum used to transmit digital audio information in the HIBOC DAB system.

In the illustrative embodiment of the invention, the DAB system may use as an inner code a complementary punctured pair convolutional (CPPC) code with optimum bit placement (OBP) in the digital sidebands 102, 104. CPPC codes and OBP techniques suitable for use in the systems of the invention are described in, e.g., U.S. patent application Ser. No. 09/217,655, filed Dec. 21, 1998 in the name of inventors Brian Chen and Carl-Erik W. Sundberg and entitled "Optimal Complementary Punctured Convolutional Codes,", which is incorporated by reference herein. More specifically, the illustrative embodiment may use, e.g., a pair of rate-⅘, memory M =6 CPPC codes for the two sidebands, yielding a combined rate-⅖ code. The bit placement may be optimized, e.g., for a case in which the outermost frequency components are expected to be the sideband components most susceptible to first adjacent interference.

Although illustrated herein with CPPC codes, the invention can be utilized with numerous alternative code arrangements, e.g., classic code combining with OBP, multiple stream coding, etc.

The system in the illustrative embodiment may use a cyclic redundancy code (CRC) as an outer forward error correcting (FEC) or error detecting code, and differential quadrature phase shift keyed (DQPSK)/OFDM modulation. The DQPSK modulation of transmitted symbols provides robustness to frequency-selective fading and oscillator phase drift. The differential encoding is performed in frequency between OFDM tones. The digital signal to be transmitted and the outer CRC block code are repeated in each of the sidebands 102, 104.

As shown in FIG. 1, each of the sidebands 102, 104 include N components, 102-1, 102-2, . . . 102-N, and 104-1, 104-2, . . . 104-N, respectively. The components may represent, e.g., sets of orthogonal frequency division multiplexed (OFDM) carriers. Pilot tones 103 are present at either end of the sideband 102, and pilot tones 105 are present at either end of the sideband 104. Additional pilot tones, which are not shown, may be present elsewhere in the portion of the frequency spectrum shown. The pilot tones 103, 105 correspond to selected OFDM reference tones, and may be used, e.g., to determine the presence of interference.

The present invention provides improved outer code configurations that may be implemented in the HIBOC DAB system of FIG. 1 as well as in other types of communication systems. A HIBOC system having a spectrum of the type illustrated in FIG. 1 will now be described in greater detail with reference to FIGS. 2 and 3.

Figure 2:
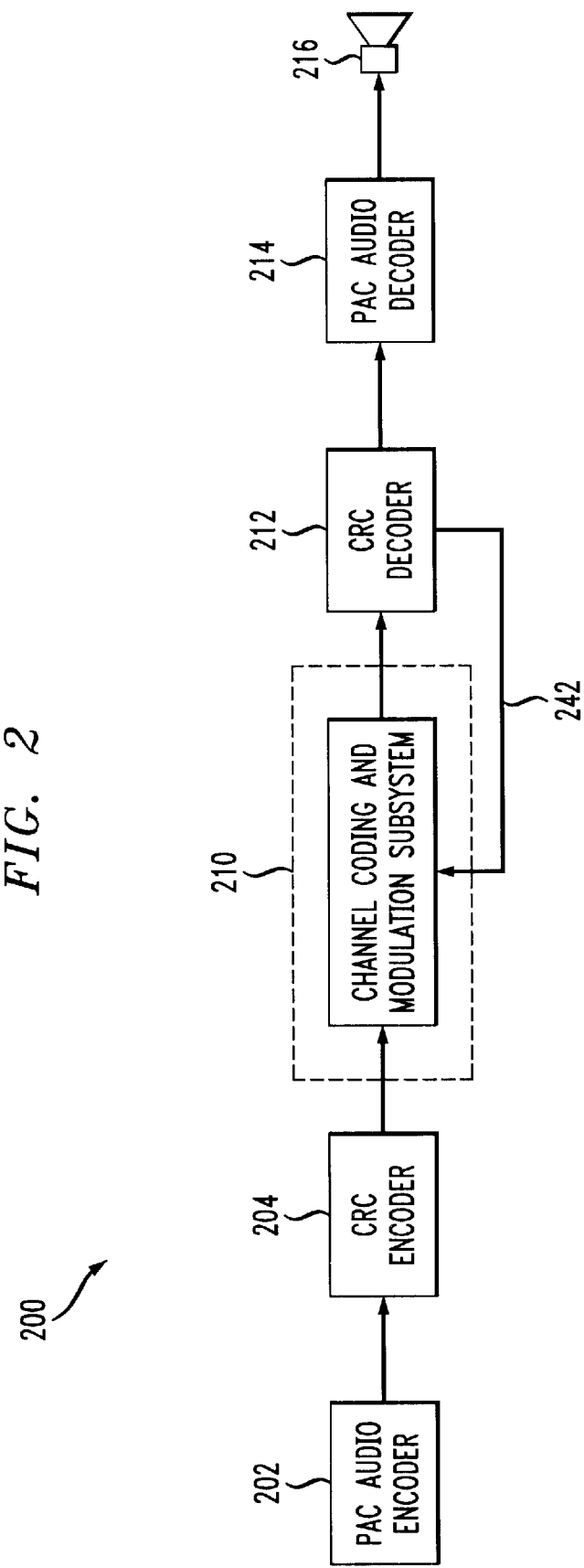
FIG. 2 is a block diagram of a HIBOC DAB system in which the invention may be implemented.

FIG. 2 shows an exemplary FM HIBOC DAB system 200 in which the invention may be implemented. The system 200 includes portions of a transmitter and a receiver. It should be noted that FIG. 2 shows primarily the digital portion of the system, i.e., the portions associated with generation and processing of the digital signals. Additional conventional processing elements may be used to process the analog signals.

In the system 200, a PAC audio coder 202 generates an encoded audio signal at a bit rate of, e.g., 96 kbps using the audio compression techniques described in, e.g., the above-cited PAC reference D. Sinha, J. D. Johnston, S. Dorward and S. R. Quackenbush, "The Perceptual Audio Coder," in Digital Audio, Section 42, pp. 42-1 to 42-18, CRC Press, 1998. The encoded audio bit stream is applied to a CRC encoder 204, which generates CRC bits in a conventional manner using a CRC error detecting block code, and then to, a channel coding and modulation subsystem 210.

As previously noted, the CRC is an example of one type of outer code that may be used in the system 200. Other possible outer codes suitable for use with the present invention include, e.g., Reed-Solomon (RS) codes, Bose-Chadhuri-Hocquienghem (BCH) codes, as well as other types of block codes. Other cyclic codes, as well as non-cyclic shortened codes, can also be used as outer codes in accordance with the invention.

Figure 3:
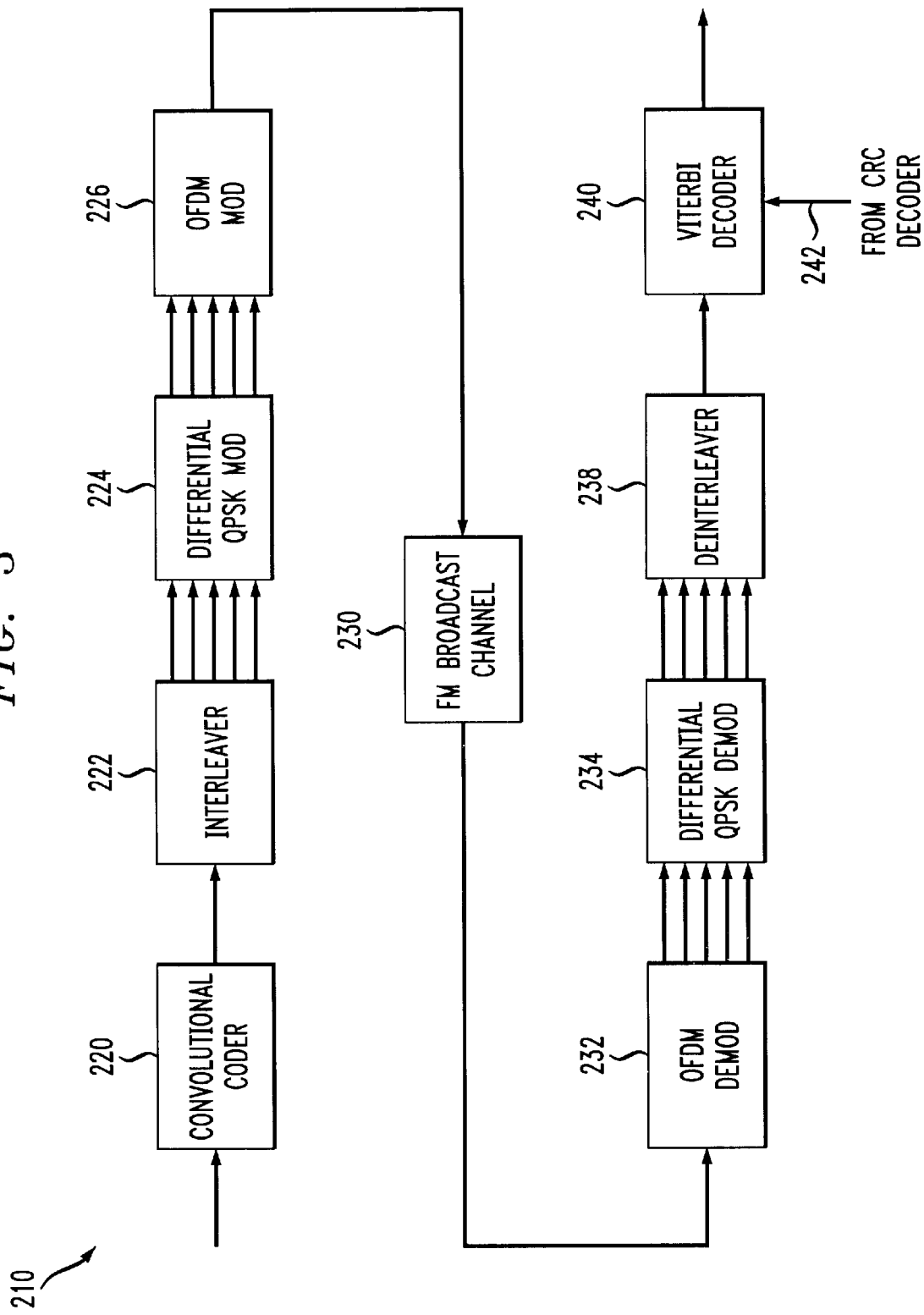
FIG. 3 is a block diagram showing a more detailed view of a channel coding and modulation subsystem of the FIG. 2 HIBOC DAB system.

As shown in FIG. 3, the subsystem 210 performs channel coding, modulation, transmission, reception, demodulation and channel decoding operations. It is assumed for purposes of illustration that the subsystem 210 includes an FM broadcast channel 230 over which the HIBOC DAB signals are transmitted. The subsystem 210 of FIG. 3 comprises a transmitter portion including a convolutional coder 220, e.g., a CPPC coder for coding the audio bitstream in accordance with the above-noted CPPC techniques, an interleaver 222, a DQPSK modulator 224, and an OFDM modulator 226.

As previously noted, the convolutional coding performed in coder 220 is an example of a type of inner code that may be used in the system 200. Other types of inner codes may also be used, including block or convolutional codes, so-called "turbo" codes, and coding associated with trellis coded modulation. The modulated output of the OFDM modulator 226, which corresponds to the digital sidebands 102 and 104, is transmitted through the FM broadcast channel 230 to a receiver portion including an OFDM demodulator 232, a DQPSK demodulator 234, a deinterleaver 238, and a Viterbi decoder 240.

Referring again to FIG. 2, the demodulated and decoded received signal from the receiver portion of the subsystem 210 is applied to a CRC decoder 212, and then to a PAC audio decoder 214. The CRC decoder 212 generates an error flag which is supplied via output 242 to the Viterbi decoder 240 of FIG. 3. The error flag may also be used to trigger conventional error mitigation processes in the PAC audio decoder 214. The reconstructed audio signal from decoder 214 is applied to an output device 216, e.g., a speaker or set of speakers, for conversion to an audibly-perceptible form.

The Viterbi decoder 240 of FIG. 3 may utilize List Viterbi algorithm (LVA) techniques in which a CRC error flag or other type of outer code error flag is used to trigger selection of one or more alternative decoding paths generated by the decoder. For example, a CRC error flag supplied via output 242 may trigger selection of a next-most-likely path if the error flag indicates an error in the most-likely path, and so on.

Another example of an LVA technique suitable for use with the present invention is a so-called "short list" type of List Viterbi decoding. The list size in the illustrative embodiment is preferably on the order of, e.g., two, three or four entries. The short list is acceptable because first adjacent interference signals in typical FM HIBOC DAB systems generally lead to slowly changing interference levels, e.g., as a receiver in an automobile moves within an area with a first adjacent interference signal. Furthermore, it will generally be desirable for a given erased component to remain erased over a number of CRC frames. The exact list sizes and number of component erasures may be established using simulations, as will be apparent to those skilled in the art.

It should again be emphasized that the above-described configuration of the FM HIBOC system in the illustrative embodiment of the invention is by way of example only. Those skilled in the art will appreciate that the improved outer code configurations of the present invention may be implemented in numerous other types of systems.

The system of the illustrative embodiment may use a variety of different outer code configurations to generate the above-noted error flags for triggering an error mitigation algorithm in the PAC decoder 214.

Figure 4:
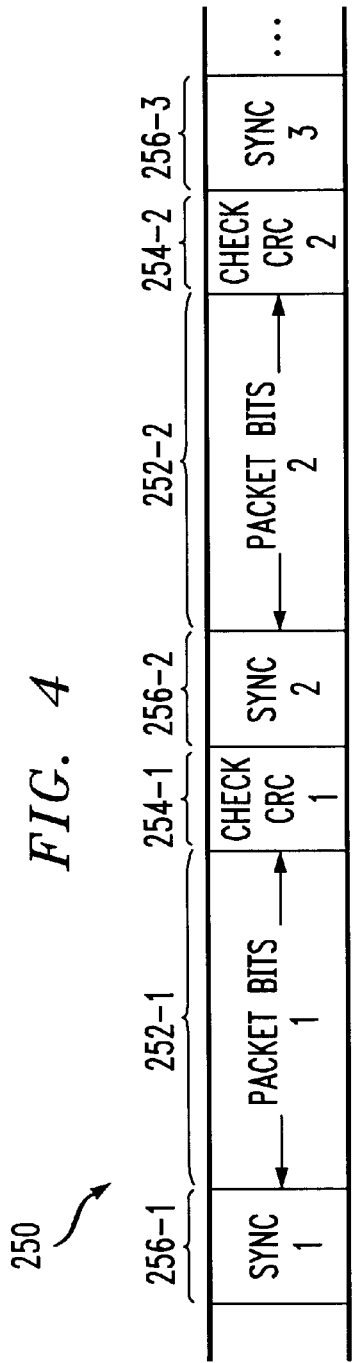
FIGS. 4 and 5 show first and second outer code configurations, respectively, that may be used in the HIBOC DAB system of FIGS. 1–3.

FIG. 4 illustrates one possible outer code configuration that may be used in the above-described HIBOC DAB system. In this configuration, sa fixed-length CRC, i.e., a fixed number of CRC check bits, is added to each PAC audio packet irrespective of the length of the packet. More particularly, a bitstream 250 at the output of the CRC encoder 204 includes a number of PAC packets 252-1, 252-2, etc. Associated with the PAC packets 252-1, 252-2, . . . are corresponding fixed-length CRCs 254-1, 254-2, etc. and synchronization (SYNC) codes 256-1, 256-2, etc., respectively. The number of bits allocated for CRC may be taken from a bit allocation as determined prior to an executing rate loop. A problem with this configuration is that it fails to provide partial error flagging, i.e., if a given fixed-length CRC indicates an error in its corresponding PAC packet, the entire packet must be discarded.

Figure 5:
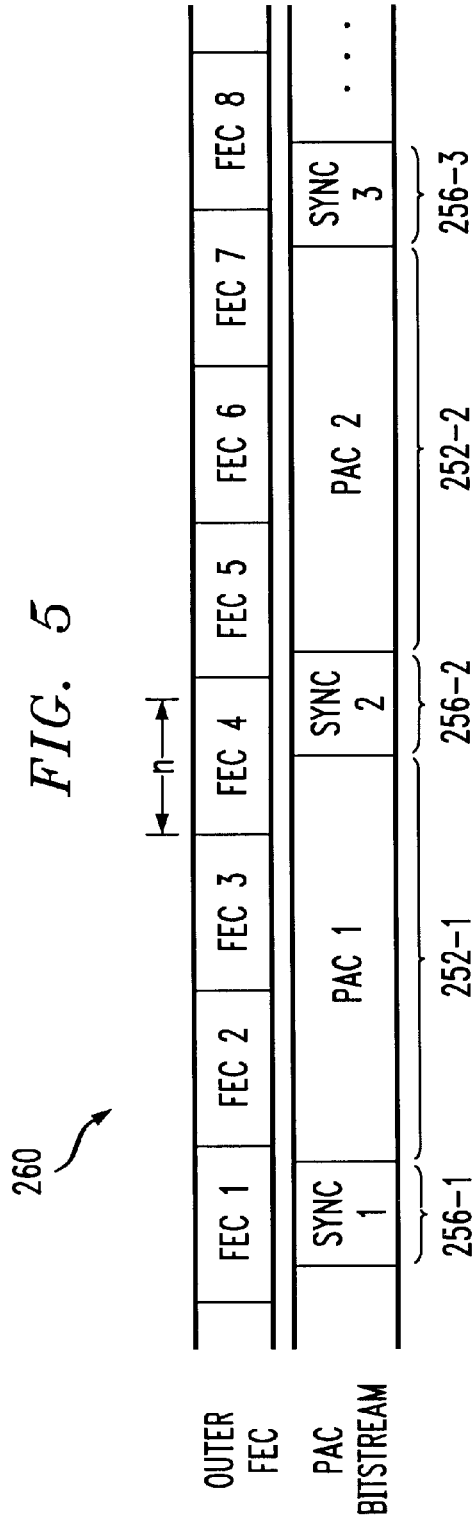

FIG. 5 shows another possible outer code configuration that may be used in the above-described HIBOC DAB system. In this configuration, different error flags may be generated for different portions of a given PAC packet. More particularly, outer FEC fields denoted FEC 1, FEC 2, FEC 3, etc. are each generated over a set of n bits, such that each FEC field is associated with a particular portion of a given PAC packet. As a result, partial error flagging is provided, i.e., one or more portions of a given PAC packet that are determined to be in error based on the outer FEC fields can be discarded while other portions of the same packet that are not in error can be used.

A PAC bitstream 260 at the output of the PAC decoder 202, i.e., prior to insertion of the FEC bits, includes the PAC packets 252-1, 252-2, etc. and corresponding SYNC codes 256-1, 256-2, etc., respectively. The outer code in this configuration is asynchronous to the PAC packets, such that separate synchronization is required for the outer FEC code and the PAC packets. The outer code may be of a fixed and suitably optimized code word length at a selected code rate. As in the previous configuration, the PAC packet synchronization provided by the SYNC codes 256-1, 256-2, 256-3, etc.

A potential problem with the configuration illustrated in FIG. 5 is that a particular FEC block may overlap two adjacent PAC frames and therefore may trigger double packet losses. Another problem with this configuration is that, as previously noted, it requires separate synchronization for the outer FEC blocks.

Figure 6:
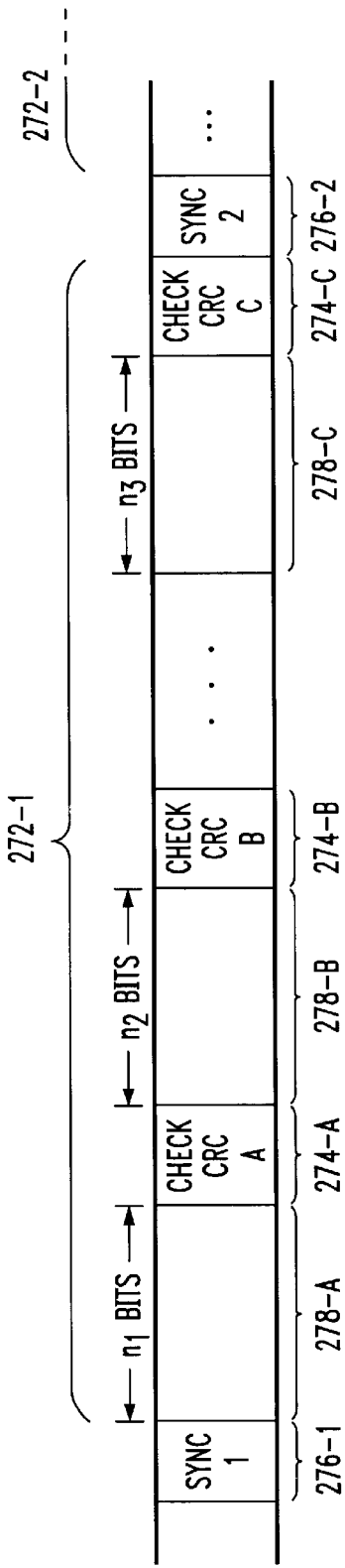
FIGS. 6, 7 and 8 show improved outer code configurations in accordance with the invention.
Figure 7:
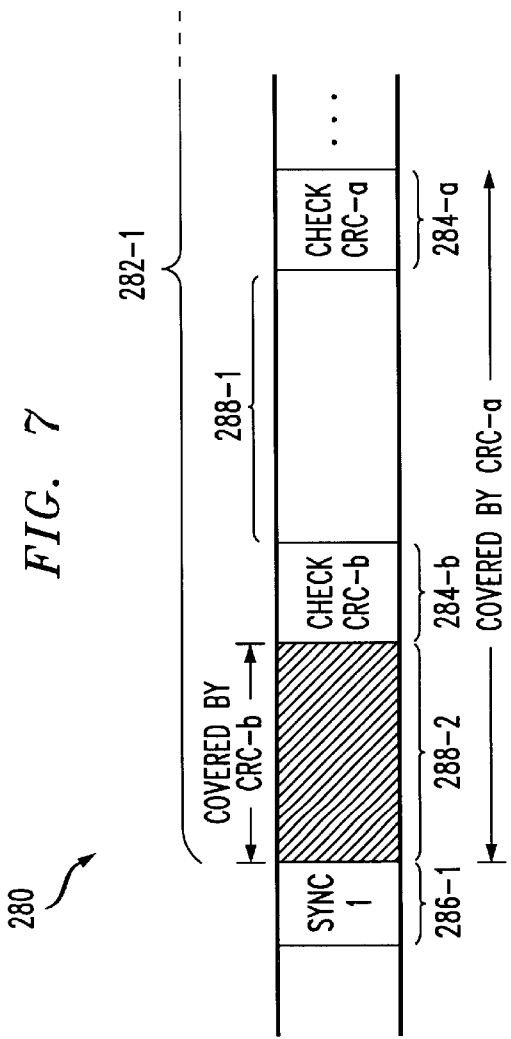
Figure 8:
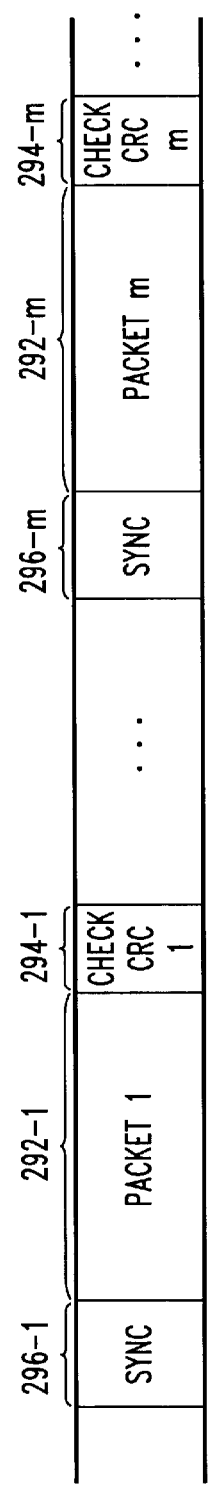

FIGS. 6, 7 and 8 illustrate improved outer code configurations in accordance with the invention that overcome the problems associated with the configurations of FIGS. 4 and 5. Advantageously, in each of these improved configurations, partial error flagging is provided, but the outer code structure is also synchronous to the PAC frame. Furthermore, the overhead for the outer code may be adapted to individual PAC packets, i.e., less overhead may be provided for very short packets and larger overhead for more critical long packets. These configurations thus allow the outer code bits to be better matched to the criticality of the audio information. As a result, improved performance can be provided without an increase in outer code overhead.

FIG. 6 shows a configuration of the type described above, in which multiple outer code words are associated with each PAC packet. In this configuration, a bitstream 270 at the output of the CRC encoder 204 includes a number of PAC packets 272-1, 272-2, etc. which are synchronized using corresponding SYNC codes 276-1, 276-2, etc., respectively. A given one of the PAC packets 272-1 is separated into a number of different groups of bits 278. In this example, there are at least three groups of bits 278-A, 278-B and 278-C, including $n_1$, $n_2$ and $n_3$ bits, respectively. The bitstream 270 also includes fixed-length CRCs 274-A, 274-B and 274-C generated for the corresponding groups of bits 278-A, 278-B and 278-C, respectively. There are thus three outer code words associated with the packet 272-1 in this example, providing partial error flagging for each of the groups of bits 278. The SYNC codes 276-1, 276-2, etc. provide synchronization for both the packets and the fixed-length CRCs.

In the FIG. 6 configuration, all of the groups may have the same number of bits, i.e., $n_1$, $n_2$ and $n_3$ may all be equal. Alternatively, only a subset of the groups could have the same number of bits. For example, the first or last groups of bits in a given packet could include a lesser number of bits than the other groups, i.e., a "round off" of the number of bits could occur at the beginning or at the end of the given packet. It should also be noted that, since PAC packet length is variable, the particular number of CRCs could of course vary from packet to packet.

FIG. 7 shows an outer code configuration with nested multiple outer code words associated with each PAC packet. In this configuration, a bitstream 280 at the output of the CRC encoder 204 comprises a number of PAC packets 282-1, etc. which are synchronized using corresponding SYNC codes 286-1, etc., respectively. The PAC packet 282-1 is separated into a number of different groups of bits 288. In this example, there are at least two groups of bits 288-1 and 288-2, each including a different number of bits. The bitstream 280 also includes fixed-length CRCs 284-a and 284-b. CRC 284-a is generated for the bits in both of the groups 288-1 and 288-2, i.e., CRC 284-a covers the bits in both of these groups. CRC 284-b is generated for only the bits in the group 288-2, i.e., CRC 284-b covers the bits in group 288-2 only. There are thus at least two outer code words associated with the packet 282-1 in this example, providing partial error flagging for each of the groups of bits 288. The SYNC codes 286-1, etc. provide synchronization for both the packets and the fixed-length CRCs.

FIG. 8 shows an outer code configuration in which variable-length CRCs are matched to PAC packet length. In this configuration, a bitstream 290 at the output of the CRC encoder 204 includes a number of PAC packets 292-1, . . . 292-m which are synchronized using corresponding SYNC codes 296-1, . . . , 296-m. Associated with each of the packets is one or more variable-length CRCs, arranged sequentially within a given packet in a manner similar to that previously described in conjunction with FIG. 6. For example, packet 292-1 includes at least CRC 294-1, and packet 292-m includes at least CRC 294-m. Although only a single variable-length CRC is shown for each packet in FIG. 8, for simplicity of illustration, it should be understood that there will generally be multiple CRCs for each packet. Again, this configuration, like those described in conjunction with FIGS. 6 and 7, provides partial error flagging, and common synchronization of PAC packets and outer code words.

It should be understood that the outer code configurations shown in FIGS. 6, 7 and 8 are intended as examples only, and numerous alternative configurations can be generated in accordance with the invention. For example, various combinations of the above-described configurations may also be used. A possible alternative configuration of this type may include a single level of nesting as described in conjunction with FIG. 7, followed by a sequential arrangement of fixed-length CRCs as described in conjunction with FIG. 6 for the remainder of the packet. Another possibility is to have a sequential arrangement of multiple fixed-length CRCs followed by a single variable-length CRC. Numerous other combinations of the FIGS. 6, 7 and 8 configurations as well as other alternative configurations will be apparent to those skilled in the art. In addition, although the particular outer code configuration used in a given embodiment may be fixed, other embodiments could be configured such that the outer code configuration is selectable, i.e., different configurations can be selected for use at different times, in accordance with changes in channel conditions or other system characteristics.

Figure 9:
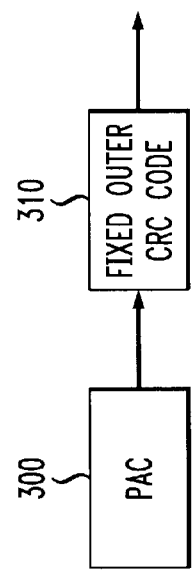
FIGS. 9 and 10 illustrate the interactions between a perceptual audio coder (PAC) encoder and an outer code encoder in two different outer code configurations.

The interaction between a PAC encoder and an outer code encoder in accordance with the invention will be described in conjunction with FIGS. 9 and 10. FIG. 9 shows the interaction between a PAC encoder 300 and a fixed outer CRC code encoder 310. This is the type of interaction associated with the fixed-length CRC configuration described in conjunction with FIG. 4, with the PAC encoder 300 operating at a fixed bit rate.

In the outer code configurations of FIGS. 6, 7 and 8, the outer code overhead in bits is a function of PAC packet length. This overhead needs to be incorporated both at the bit allocation and rate loop processes of PAC encoding. Since the PAC encoder rate loop modifies packet length at each iteration, the corresponding outer code overhead needs to be determined. This may be done using a table lookup process, or other suitable technique.

Figure 10:
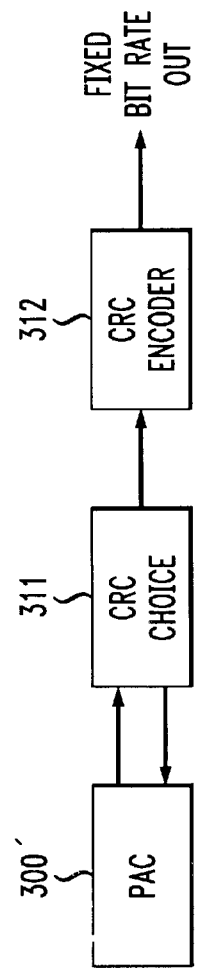

FIG. 10 illustrates the interaction between a PAC encoder 300' and an outer CRC code encoder 312 in this situation. A CRC choice element 311 determines the number of CRC bits required to encode a given PAC packet. For example, the CRC choice element 311 may determine the number of CRC bits that will be required to encode the given packet using a particular outer code configuration by performing a table lookup process using as an index an estimated packet length as supplied by the PAC encoder 300'. The required number of CRC bits is then supplied back to the PAC encoder 300', and used in the bit allocation and rate loop processes of the PAC encoder 300'. The CRC choice element 311 may be implemented in the PAC encoder 300' or in the CRC encoder 312, or in a combination of both encoders. It should be noted that the PAC encoder 300' may correspond to the encoder 202 of FIG. 2, and the outer code encoder 312 may correspond to the CRC encoder 204 of FIG. 2.

A significant advantage of the FIG. 10 arrangement is that it can provide improved performance relative to the FIG. 9 arrangement without any increase in the overhead associated with the outer code bits.

As previously noted, the techniques of the invention can be combined with LVAs in a straightforward manner to further improve decoding efficiency. Moreover, although illustrated using CPPC inner codes, the invention can be used with identical inner codes on both the upper and lower sidebands, as well as numerous other inner code configurations, including, e.g., multiple stream coding configurations.

The illustrative embodiment as described in conjunction with FIGS. 2 and 3 may include additional processing elements, such as modulators, multiplexers, upconverters and the like, which are not shown for simplicity of illustration. In addition, these embodiments may be implemented using other arrangements of elements, including elements other than those shown. Moreover, certain signal processing-elements, such as the coders and decoders, may be implemented at least in part using one or more application-specific integrated circuits (ASICs), microprocessors or other types of digital data processors, as well as portions or combinations of these and other known devices. Various elements of the illustrative embodiment may also be implemented in whole or in part in the form of one or more software programs executed by a central processing unit (CPU) or the like in a digital data processor.

It should again be emphasized that alternative embodiments of the invention can utilize other types of outer codes, e.g., RS, BCH or other block codes, other types of inner codes, e.g., various types of convolutional codes, turbo codes, or coding associated with trellis coded modulation, and a variety of different types of interleaving, e.g., block interleaving, convolutional interleaving, or random interleaving. Embodiments which utilize an RS, BCH or other similar type of error correcting outer code can of course use the code for error correction as well as for generation of an error flag for controlling PAC error mitigation.

The invention can also be implemented using only a single channel code, e.g., only an outer code. In such an arrangement, which does not utilize an inner code, the outer code may be simply referred to as a channel code.

Although illustrated in the context of frequency division multiplexing (FDM), the invention can also be applied toga wide variety of frame formats, including time division multiplexed (TDM) and code division multiplexed (CDM) formats, as well as combinations of TDM, FDM, CDM and other types of frame formats. Furthermore, although not described in detail herein, numerous different types of modulation techniques may be used in conjunction with the invention, including, e.g., single-carrier modulation in every sideband component, or multi-carrier modulation, e.g., OFDM, in every sideband component. A given carrier can be modulated using any desired type of modulation technique, including, e.g., a technique such as m-QAM, m-PSK or trellis coded modulation.

It should be noted that the invention can be used with a wide variety of other types and arrangements of frequency spectra, e.g., spectra with a single frequency band and no host carrier signal, spectra with more than two sidebands, etc.

As previously noted, the invention can be applied to the transmission of digital information other than audio, such as data, video, images and other types of information. Although the illustrative embodiment uses audio packets, such as those generated by a PAC encoder, the invention is more generally applicable to digital information in any form and generated by any type of compression technique. The invention may be implemented in numerous applications, such as simultaneous multiple program listening and/or recording, simultaneous delivery of audio and data, etc. These and numerous other alternative embodiments and implementations within the scope of the following claims will be apparent to those skilled in the art.

What is claimed is:

1. A method of processing digital information for transmission in a communication system, wherein the digital information is transmitted using at least one channel code, the method comprising the steps of:

associating with a given packet of the digital information a plurality of code words of the channel code, in accordance with a particular channel code configuration, so as to provide partial error flagging for different portions of the given packet; and determining a bit allocation for transmission of the packet at a particular bit rate based at least in part on the channel code configuration.

2. The method of claim 1 wherein the digital information is transmitted using an inner code and an outer code, and the channel code configuration comprises an outer code configuration.

3. The method of claim 2 wherein the outer code configuration comprises a plurality of code words arranged sequentially within the given packet.

4. The method of claim 2 wherein the outer code configuration comprises a plurality of nested code words within the given packet.

5. The method of claim 2 wherein the outer code configuration comprises at least one level of nested code words in combination with at least one additional sequentially-arranged code word.

6. The method of claim 2 wherein the outer code configuration comprises a plurality of sequentially-arranged fixed-length code words followed or preceded by a single variable-length code word.

7. The method of claim 2 wherein the outer code comprises a block code.

8. The method of claim 2 wherein the outer code comprises a cyclic code.

9. The method of claim 2 wherein the outer code comprises a CRC code.

10. The method of claim 2 wherein the outer code comprises an RS code.

11. The method of claim 2 wherein the outer code comprises a BCH code.

12. The method of claim 1 wherein the digital information comprises audio information.

13. The method of claim 1 wherein the digital information is encoded using an audio encoder to generate a plurality of packets including the given packet.

14. The method of claim 1 wherein an error flag generated as a result of the partial error flagging is supplied to an audio decoder and used to trigger an error mitigation algorithm in the decoder.

15. An apparatus for processing digital information for transmission in a communication system, wherein the digital information is transmitted using at least one channel code, the apparatus comprising:

a transmitter operative to associate with a given packet of the digital information a plurality of code words of the channel code, in accordance with a particular channel code configuration, so as to provide partial error flagging for different portions of the given packet; and to determine a bit allocation for transmission of the packet at a particular bit rate based at least in part on the channel code configuration.

16. The apparatus of claim 15 wherein the digital information is transmitted using an inner code and an outer code, and the channel code configuration comprises an outer code configuration.

17. The apparatus of claim 16 wherein the outer code configuration includes a plurality of code words arranged sequentially within the given packet.

18. The apparatus of claim 16 wherein the outer code configuration includes a plurality of nested code words within the given packet.

19. The apparatus of claim 16 wherein the outer code configuration includes at least one level of nested code words in combination with at least one additional sequentially-arranged code word.

20. The apparatus of claim 16 wherein the outer code configuration includes a plurality of sequentially-arranged fixed-length code words followed or preceded by a single variable-length code word.

21. The apparatus of claim 16 wherein the outer code comprises a block code.

22. The apparatus of claim 16 wherein the outer code comprises a cyclic code.

23. The apparatus of claim 16 wherein the outer code comprises a CRC code.

24. The apparatus of claim 16 wherein the outer code comprises an RS code.

25. The apparatus of claim 16 wherein the outer code comprises a BCH code.

26. The apparatus of claim 15 wherein the digital information comprises audio information.

27. The apparatus of claim 15 wherein the digital information is encoded using an audio encoder to generate a plurality of packets including the given packet.

28. The apparatus of claim 15 wherein an error flag generated as a result of the partial error flagging is supplied to an audio decoder and used to trigger an error mitigation algorithm in the audio decoder.

29. A transmitter for processing digital information for transmission in a communication system, wherein the digital information is transmitted using at least one channel code, the transmitter comprising:

an information, encoder for encoding the digital information; and a channel code encoder having an input coupled to an output of the information encoder, and operative to provide channel code words in accordance with a particular channel code configuration, such that associated with a given packet of the digital information is a plurality of code words of the channel code providing partial error flagging for different portions of the given packet;

wherein the information encoder determines a bit allocation for transmission of the packet at a particular bit rate based at least in part on the channel code configuration.

30. The apparatus of claim 29 wherein the digital information is transmitted using an inner code and an outer code, and the channel code configuration comprises an outer code configuration.

* * * * *